C. BARGAMIN.
AUTOMATIC CUT-OFF FOR GAS RANGES.
APPLICATION FILED NOV. 23, 1912.
1,075,322.
Patented Oct. 14, 1913.
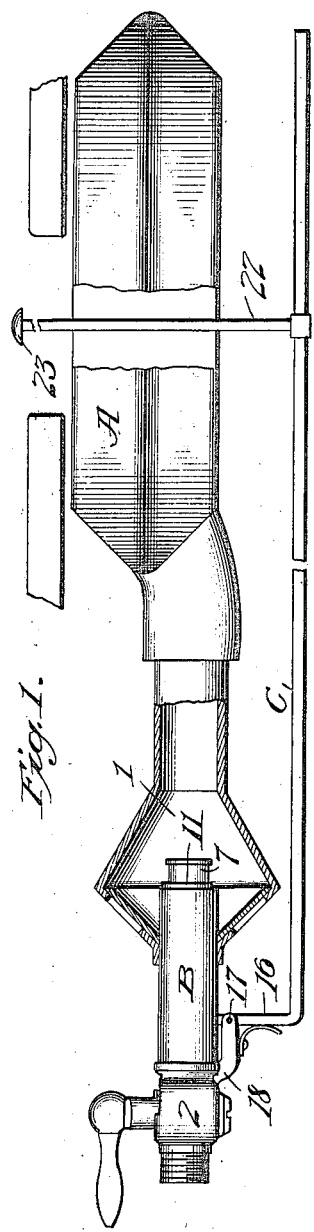
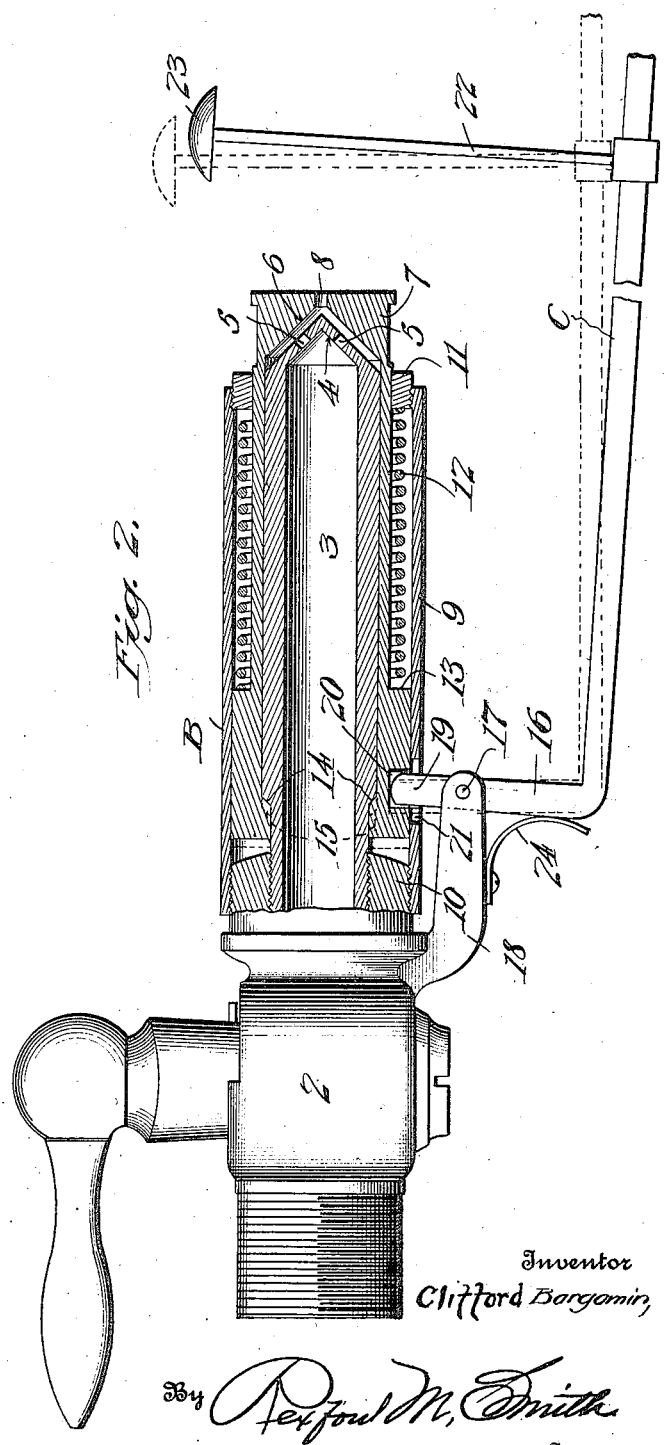
Witnesses
Inventor
Clifford Bargamin,
By
Attorney

UNITED STATES PATENT OFFICE.

CLIFFORD BARGAMIN, OF NEWPORT NEWS, VIRGINIA, ASSIGNOR TO THE SENTINEL AUTOMATIC GAS APPLIANCE CO., OF NEW HAVEN, CONNECTICUT.

AUTOMATIC CUT-OFF FOR GAS-RANGES.

1,075,322.  Specification of Letters Patent.  Patented Oct. 14, 1913.

Application filed November 23, 1912. Serial No. 733,227.

*To all whom it may concern:*

Be it known that I, CLIFFORD BARGAMIN, a citizen of the United States, residing at Newport News, in the county of Warwick and State of Virginia, have invented certain new and useful Improvements in Automatic Cut-Offs for Gas-Ranges, of which the following is a specification, reference being had therein to the accompanying drawing.

This invention relates to an automatic cut-off for gas ranges whereby the flow of gas is automatically stopped when the flame is no longer required, as for instance when a cooking utensil is removed from the range.

The invention has for one of its objects to provide an extremely simple, inexpensive and effective device of this character applicable for ranges of ordinary design and which is thoroughly reliable and efficient in use.

Another object of the invention is the provision of a novel arrangement of valve mechanism associated with the nozzle of the gas cock and operatively connected with a device which is controlled by the placing of a cooking utensil on or the removal of it from the gas range burner.

With such objects in view and others, as will appear as the description proceeds, the invention comprises the various novel features of construction and arrangement of parts which will be more fully described hereinafter and set forth with particularity in the claims appended hereto.

In the accompanying drawing, which illustrates one embodiment of the invention, Figure 1 is a side view of a gas range burner with the automatic cut-off device applied thereto, a portion of the burner being shown broken away and the mixing tube in section. Fig. 2 is an enlarged sectional view of the gas cut-off device.

Similar reference characters are employed to designate corresponding parts throughout the views.

Referring to the drawing, A designates an ordinary gas burner of any desired construction which has a mixing tube of usual form that receives gas from a cock 2, the nozzle of which is provided with an automatic cut-off device B. This device comprises a nozzle tube 3 which is formed with a conical outer end 4 having gas outlet ports 5. The external surface of the cone or point 4 is accurately ground to form a seat for the conical surface 6 of the valve 7, such valve being in the form of a tubular body snugly but slidably fitting around the nozzle tube 3. The valve has a port 8 through which the gas issues into the mixing tube 1 of the burner when the valve is unseated as shown in Fig. 2. The tubular valve 7 is slidably disposed within an external tube or casing 9, which is internally threaded to screw on the boss 10 of the cock 2, the nozzle tube being externally threaded to screw into such boss 10. In the outer end of the casing 9 is screwed a ring 11 which forms an abutment for one end of a helical compression spring 12 that encircles the valve 7 and its inner end bearing on the shoulder 13 on the said valve. The spring is under a tension which tends to move the valve inwardly so as to cut off the gas supply. On the nozzle tube and valve are shoulders 14 and 15, respectively, that are adapted to engage each other when the valve is open so that gas is prevented from flowing back between the nozzle tube and valve and escaping into the atmosphere when the valve is opened.

The valve is opened by means of a device C which comprises a lever 16 fulcrumed at 17 on a bracket 18 carried by the gas cock 2, said lever having the extremity 19 engaged in a recess 20 in the valve 7, the casing 9 being provided with an opening 21 to receive the extremity 19 of the lever. The lever extends under the burner A and is provided with an upwardly-extending member 22 which passes through the burner A and has a knob or equivalent device 23 at its upper end, which knob normally projects above the plane of the burner so that when a pot or other utensil is placed in position on the gas range, the knob will be pressed downwardly and the lever tilted from the dotted line position, Fig. 2, to the full line position, thereby causing the valve 7 to open. A spring or equivalent device 24 operates on the lever to hold the same with the knob normally raised, said spring supplementing the action of the valve-closing spring 12. When the pot or cooking utensil is removed from the stove, the spring 12 expands and moves the valve 7 inwardly, thereby bringing the surface 6 of the valve against the conical seat of the nozzle tube, and at the same time the lever is shifted from the full to the dotted line position. In this manner, the gas is automatically cut off when the cooking utensil is removed from the stove.

To render the apparatus complete, there will be a pilot burner leading from the cock 2 to the burner A, so that when the valve 5 is closed to cut off the main supply of gas, the flame of the pilot burner will continue to burn so as to be available to light the main burner when the valve 7 is again opened by the placing of a cooking utensil over the burner A. As the use of a pilot burner in connection with the main burner is an old idea, it is not deemed necessary to illustrate the same in this connection.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what I claim as new, is:—

1. The combination of a gas cock having an internally and externally threaded boss, a nozzle engaging the internal thread of the boss, a valve of tubular form slidably mounted on the nozzle, a casing engaging the external thread of the boss and surrounding the valve, a spring disposed within the casing and extending around the valve to seat the latter, and means engaging the valve for opening the same against the tension of the spring.

2. The combination of a gas cock, a nozzle connected therewith, a valve of tubular form slidably mounted on the nozzle, a casing surrounding the valve and having a slot, a lever fulcrumed on the cock and having one end extending into the slot of the casing to engage the valve, a utensil-engaging device connected with the lever, and means within the casing and acting on the valve to close the same.

3. The combination of a burner, a gas cock, a nozzle tube connected with the cock, a casing connected with the cock, a valve slidably mounted on the nozzle tube and arranged within the casing, a spring in the casing and operating on and surrounding the valve to close the same, and a device connected with the valve and operating in opposition to the spring to open the valve when the device is depressed by the placing of a cooking utensil over the burner.

4. The combination of a gas cock, a nozzle tube thereon having an outlet port, a tubular valve slidably mounted on the nozzle and having a portion for closing the said port of the nozzle, a tubular casing around the valve, a spring surrounding the valve and disposed in the casing with one end engaged with the valve to close the same and means connected with the valve for opening the same.

5. The combination of a nozzle tube having an outlet port, a tubular valve slidably mounted thereon and having a portion for opening and closing the said port, said valve and nozzle having portions at their inner ends adapted to engage each other when the valve is open to prevent the back flow and escape of gas, a spring for closing the valve, and a utensil actuated device connected with the valve for opening the same.

In testimony whereof I affix my signature in presence of two witnesses.

CLIFFORD BARGAMIN.

Witnesses:
F. W. HOOSE,
C. E. ZUNDER.